Figure 1:
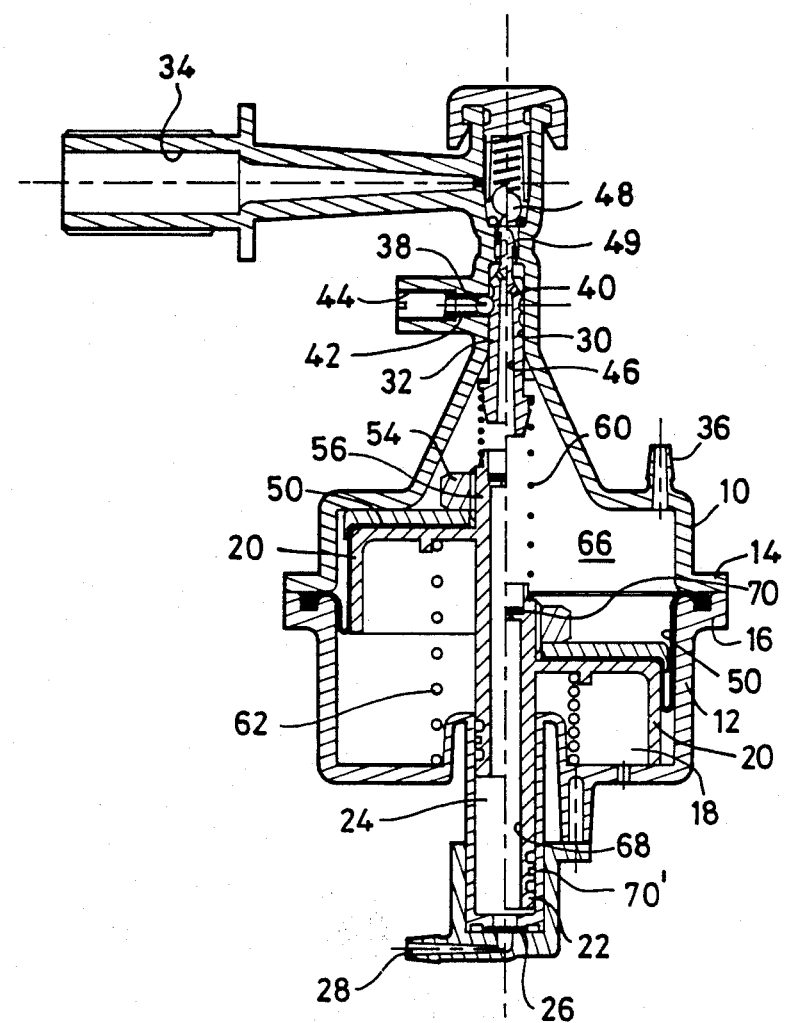

United States Patent [19]

Wood

[11] Patent Number: 4,827,875
[45] Date of Patent: May 9, 1989

[54] DILUTION VALVES

[75] Inventor: Timothy M. Wood, Royston, Great Britain

[73] Assignee: Rumen Chemie AG, Glarus, Switzerland

[21] Appl. No.: 146,216

[22] Filed: Jan. 20, 1988

[30] Foreign Application Priority Data

Jan. 29, 1987 [GB] United Kingdom ............... 8702031
Jul. 10, 1987 [GB] United Kingdom ............... 8716286

[51] Int. Cl.⁴ ........................................... G05D 11/03
[52] U.S. Cl. ............................................ 119/72; 137/99
[58] Field of Search ................. 137/99, 101.31; 417/377; 119/72, 75, 71

[56] References Cited

U.S. PATENT DOCUMENTS

| | | | |
|---|---|---|---|
| 2,203,832 | 6/1940 | Malburg | 137/99 |
| 2,803,260 | 8/1957 | Wells | 137/99 |
| 3,802,395 | 4/1974 | von Taschitzki | 119/75 |
| 3,818,924 | 6/1974 | Carlyle | 137/99 |
| 3,937,241 | 2/1976 | Cloup | 137/99 |
| 3,971,341 | 7/1976 | Bron | 119/72 |
| 4,054,522 | 10/1977 | Pinkerton | 137/99 X |
| 4,165,759 | 8/1979 | Tucker | 137/99 |
| 4,276,001 | 6/1981 | Holmes | 137/99 X |

Primary Examiner—Stephen Hepperle
Attorney, Agent, or Firm—Lee & Smith

[57] ABSTRACT

A dilution valve dilutes a liquid feed concentrate with water, to give a dilute feed for feeding to piglets. The valve has a plunger (20) which reciprocates within a mixing chamber (66), to which the water and liquid feed concentrate are admitted through separate valves (48,70). Water pressure drives the plunger (20) in a charging stroke, during which water and liquid feed concentrate are admitted to the mixing chamber (66). A change-over spring (60) causes the plunger (20) to change from a charging stroke to a delivery stroke, during which dilute feed is delivered, the plunger (20) undergoing alternate charging and delivery strokes driven by the pressure of the incoming water.

9 Claims, 3 Drawing Sheets

DILUTION VALVES

FIELD OF THE INVENTION

This invention relates to dilution valves for diluting liquid concentrates with liquid diluting media.

BACKGROUND TO THE INVENTION

The invention was devised to provide a dilution valve for diluting with water a liquid feed concentrate for piglets. However, the invention has application to the dilution of any liquid concentrate with any liquid diluting medium.

GB No. 2153921A discloses mixing apparatus in which liquid concentrate and liquid diluting medium are admitted to two mixing chambers, the resulting mixture being discharged through outlets. A shuttle valve controls admission of the diluting medium to one chamber and then to the other chamber in sequence. The shuttle valve is changed over by pressure of the diluting medium acting on a diaphragm, changeover occurring when fluid pressure on the disphragm overcomes magnetic retention of the shuttle valve. The invention aims to provide a dilution valve which functions with a single mixing chamber and which has a simpler arrangement for changing over a valve controlling admission of the diluting medium.

SUMMARY OF THE INVENTION

According to one aspect of the invention a dilution valve for diluting a liquid concentrate with a liquid diluting medium comprises a mixing chamber, a plunger movable in the chamber, first valve means for controlling admission of the liquid concentrate to the chamber, second valve means for controlling admission of the diluting medium to the chamber, and a spring acting between the plunger and the second valve means, the plunger being driven by the pressure of the diluting medium to reciprocate within the chamber so as alternately to admit predetermined volumes of the concentrate and the diluting medium during a charging stroke and then deliver the resulting mixture of liquid concentrate and liquid diluting medium during a delivery stroke, the spring causing the plunger to change from a charging stroke to a delivery stroke and vice versa.

According to another aspect of the invention there is provided a dilution valve for diluting a liquid concentrate with a liquid diluting medium, the valve comprising a mixing chamber, an inlet for the diluting medium under pressure, an inlet for the liquid concentrate, an outlet for the mixture of medium and concentrate, a plunger disposed within the mixing chamber and movable in a charging stroke, during which diluting medium and liquid concentrate enter the chamber, and in a delivery stroke, during which said mixture is discharged from the chamber, first valve means for admitting the liquid concentrate to the chamber during a charging stroke, second valve means for admitting the diluting medium under pressure during a charging stroke, third valve means which are open to admit the concentrate to a concentrate chamber during the delivery stroke, during a charging stroke the pressure of the diluting medium moving the plunger to pressurise the concentrate in the concentrate chamber so as to open the first valve means to allow the concentrate to enter the mixing chamber where it mixes with the diluting medium, and a spring acting between the plunger and the second valve means, the spring causing the plunger to change from a charging stroke to a delivery stroke and vice versa, the plunger undergoing alternate charging and delivery strokes driven by the pressure of the diluting medium.

The plunger may be a piston which makes slidable sealing contact with the wall of the mixing chamber, but in a preferred embodiment the plunger moves within the mixing chamber with all round clearance bridged by a rolling diaphragm the outer periphery of which is attached to the wall of the mixing chamber and the inner periphery of which is attached to the plunger. The second valve means may include a shuttle valve with a central valve spool which shifts between two alternative positions and which has a central bore one end of which communicates with the mixing chamber and the other end of which is covered by a ball valve forming the second valve means.

The spring is preferably a helical spring which stores energy in both tension and compression and which controls shifting of the spool between its two alternative positions. The plunger may be backed by a further spring which determines the out feed pressure during a delivery stroke.

The concentrate chamber is preferably defined by a cylindrical bore within which slides a piston-like stem of the plunger. Hence, during a charging stroke the pressure of the incoming diluting medium moves the plunger, the resulting movement of the stem applying pressure to the concentrate in the concentrate chamber so as to open the first valve means. As a result, the dilution ratio is equal to the proportional areas of the mixing chamber and the concentrate chamber, the dilution ration being substantially independent of the length of stroke of the plunger. The dilution ratio can thus be accurately predetermined, being independent of variations in supply pressure of the diluting medium. It will also be appreciated that if the supply of concentrate is exhausted the valve will continue to deliver diluting medium alone, providing a valuable fail safe feature and ensuring that the valve is automatically cleansed with a diluting medium when a charge of liquid concentrate has been exhausted. A further safety feature is that undiluted concentrate cannot be fed to the outlet of the valve.

In its preferred embodiment for diluting a liquid concentrate in the form of an iron feed supplement for piglets, the diluting medium is water which is fed to the dilution valve under pressure so that the valve is capable of delivering the diluted mixture on demand with maximum reliability and the minimum of manual intervention.

Figure 2:
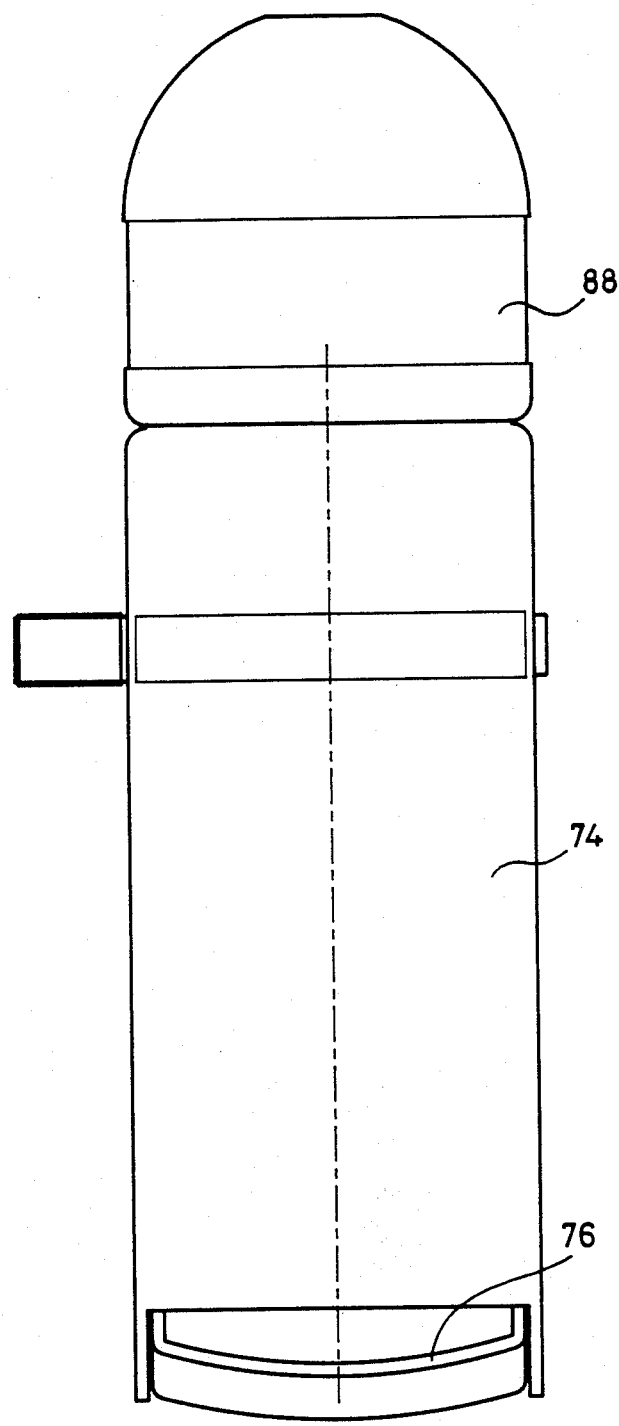
Figure 3:
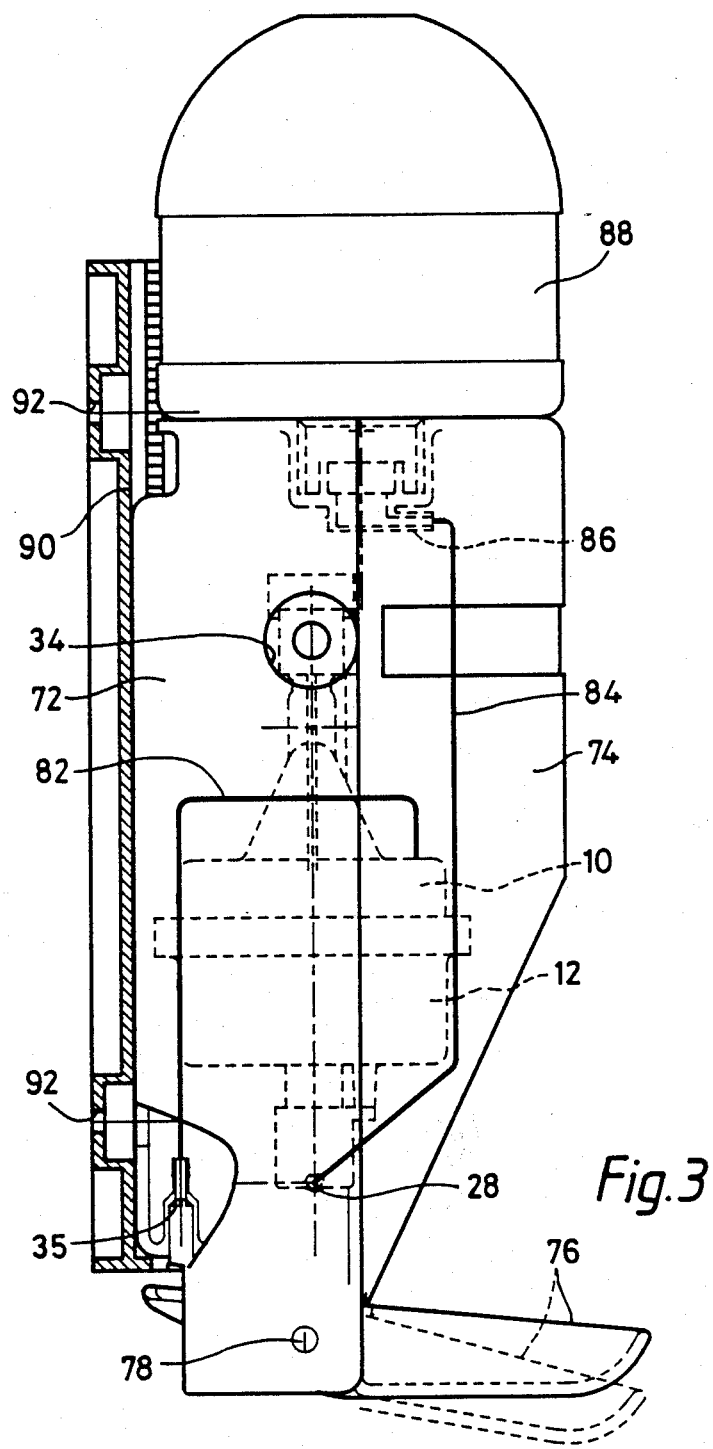

A piglet feeder incorporating a dilution valve according to the invention will now be described by way of example with reference to the accompanying drawings, in which:

FIG. 1 is a composite sectional view of the valve, showing the components at the commencement of a charging stroke on the left-hand side of the central plane and at the commencement of a delivery stroke on the right-hand side of the central plane, FIG. 2 is a front view of the piglet feeder, and FIG. 3 is a side view of the piglet feeder.

Referring to FIG. 1 of the drawings, the valve has a plastics body made in two parts 10, 12 which are secured and sealed together at abutting flanges 14, 16 respectively. The body encloses a cavity 18 within which is disposed a plunger 20 slidably movable between the end positions shown on respective sides of FIG. 1. The plunger 20 is guided for movement by a central cylindrical piston-like stem 22 which is slidably received in a cylindrical bore forming a concentrate chamber 24 in the body part 12. The chamber 24 communicates, through a one way flap valve 26, with an inlet 28 for the liquid feed concentrate.

The other body part 10 tapers upwardly to a cylindrical bore 30 slidably receiving the spool 32 of a shuttle valve. The valve spool 32 shifts between the two positions shown on respective sides of FIG. 1 in order to control admission of water (the diluting medium) through an inlet 34. The body part 10 has an outlet 36 for the delivery of the diluted mixture. The outlet 36 leads to a flap valve shown at 35 in FIG. 3 which opens to permit delivery of the mixture on demand. The valve spool 32 is held in one or other of its two alternative positions by means of a detent ball 38 urged into one of two annular recesses 40 in the spool 32 by a spring 42 held in position by a lock nut (not shown) threaded into a bore 44.

The spool 32 has a central bore 46 one end of which communicates with a mixing chamber 66 and the other end of which is closable by a ball valve 48 which controls admission of the water from the inlet 34 to the mixing chamber 66. In the position of the spool 32 shown at the left-hand side of FIG. 1, the valve 48 is open as a result of a valve stem 49 (formed on the extremity of the spool 32) lifting the ball of the valve 48 so as to admit water under pressure to the central bore 46 of the spool 32 and thence to the mixing chamber 66. In the alternative position of the valve spool shown on the right-hand side of FIG. 1, the valve 48 is closed, as a result of incoming water pressure holding the ball of the valve 48 against the end of the central bore 46.

The plunger 20 is received within the cavity 18 with all round radial clearance, this clearance being bridged by a rolling diaphragm 50 the outer periphery of which is clamped between the flanges 14, 16 and the inner periphery of which is clamped to the plunger 20 by means of a washer secured in position by a nut 54 threaded on a central boss 56 of the plunger 20. The boss 56 terminates in an anchorage for one end of a helical spring 60 the other end of which is located on the adjacent end of the valve spool 32. The spring 60 expands during a charging stroke and is compressed during a delivery stroke. The spring 60 stores energy in both tension and compression and its characteristics are chosen to cause the spool 32 to shift position (and thereby cause plunger stroke changeover) at the desired position of the plunger 20. A further coil spring 62 acts between the back of the plunger 20 and a wear plate (not shown) let into a radial end wall of the housing part 12. The spring 62 determines the pressure of the discharged mixture during a delivery stroke.

The diaphragm 50 divides the cavity 18 into two parts, the upper part (as viewed in FIG. 1) constituting the mixing chamber 66. The chamber 66 communicates with the concentrate chamber 24 by means of a bore 68 in the stem 22 and a one way flap valve 70 located in the plunger 20.

The valve works as follows: the inlet 28 is connected to a small reservoir of the liquid iron feed supplement concentrate, and the inlet 34 is connected to a supply of water under pressure. With the valve shown as on the left-hand side of FIG. 1, water pressure is communicated through the open valve 48, through the central bore 46 and into the mixing chamber 66 where the water pressure acts on the plunger 20 and the diaphragm 66 in order to move the plunger 20 downwardly as viewed in FIG. 1 in a charging stroke. This movement of the plunger 20 causes any concentrate in the concentrate chamber 24 to be pressurised, thereby opening the valve 70 to admit concentrate to the mixing chamber 66 where it is mixed with the water. If there is no concentrate in the concentrate chamber 24, for example because the valve has not been primed or because the supply of concentrate has been exhausted, no concentrate will enter the chamber 66 so pure water will be delivered.

At the end of the charging stroke, the plunger 20 is close to the end wall of the body and the spring 60 is tensioned. When the tension in the spring 60 is sufficient to overcome the force applied to the plunger spool 32 by detent ball 38, the valve spool 20 shifts to the alternative position shown on the right-hand side of FIG. 1, in which the valve 48 is closed. Hence, no liquid feed (either in concentrated or diluted form) passes through the valve 48, avoiding any risk of contamination of the water. The mixture is delivered from the outlet 36 during the ensuing delivery stroke in which the plunger moves upwardly, until the plunger 20 moves sufficiently far for the compressive force in the spring 60 to force the spool valve to change back to its position shown on the left-hand side of FIG. 1, at which point a fresh charging stroke commences. It will be understood that during a delivery stroke of the plunger liquid concentrate is drawn into the concentrate chamber through the one way valve 26, which otherwise remains closed.

The described dilution valve is designed to be fed by a reservoir of half a litre of concentrated feedstuff, which (with a 30:1 dilution ratio) delivers 15 litres of diluted feedstuff on demand over a period of approximately 22 days.

The stem 22 is sealed with respect to the walls of the bore 24 by two spaced O-rings with a grease retention groove between, ensuring lubration of the seals, as indicated generally by the reference 70 in FIG. 1.

FIGS. 2 and 3 show the valve of FIG. 1 fitted in a piglet feeder. The feeder has a case consisting of a main body 72 and a front cover 74, both injection moulded from ABS plastics material. Fitted between lugs in the main body 72 is a feed cup 76 moulded from polyethylene. The feed cup is mounted for limited pivotal movement about a horizontal pivot axis 78 and at its rear engages the actuator pin of a flap valve which serves as the valve 35 for controlling flow of the diluted mixture into the feed cup. The feed cup 76 is biased by a spring (positioned in the main body 72) to a normal position in which the front of the feed cup occupies the higher of the two limit positions illustrated in FIG. 3. In this position, the valve 35 is closed by virtue of a polyurethane flap engaging a seating. When a piglet moves the front of the feed cup 76 downwardly, the upwardly moving rear of the feed cup moves the actuator pin upwardly, to lift the polyurethane flap off its seating so as open the valve 35 and allow diluted mixture to flow into the feed cup 76 for consumption by the piglets.

In FIG. 3, reference numeral 82 denotes a flexible pipe leading diluted mixture from the outlet 36 to the valve 35, and numeral 84 denotes a flexible pipe leading liquid concentrate from a nozzle 86 to the concentrate inlet 28.

The liquid feed concentrate is supplied from a bottle 88 removably attached to the top of the main body 72. When the contents of the bottle 88 are spent, the bottle is removed from the body 72 and replaced by a full bottle of liquid feed concentrate. The liquid feed concentrate is based on an iron glutamate complex with added glutamic and hydrochloric acids, so the materials of the valve must be resistant to corrosion by this concentrate.

Filters (not shown) are included in the concentrate and water inlets.

The main body 72 is securable, at an adjusted vertical position, on a mounting 90 provided with screw retaining holes 92.

I claim:

1. A dilution valve for diluting a liquid concentrate with a liquid diluting medium, the valve comprising a mixing chamber, an inlet for the diluting medium under pressure, an inlet for the liquid concentrate, an outlet for the mixture of medium and concentrate, a plunger disposed within the mixing chamber and movable in a charging stroke, during which diluting medium and liquid concentrate enter the chamber, and in a delivery stroke, during which said mixture is discharged from the chamber, first valve means for admitting the liquid concentrate to the chamber during a charging stroke, second valve means for admitting the diluting medium under pressure during a charging stroke, third valve means which are open to admit the concentrate to a concentrate chamber during the delivery stroke, during a charging stroke the pressure of the diluting medium moving the plunger to pressurise the concentrate in the concentrate chamber so as to open the first valve means to allow the concentrate to enter the mixing chamber where it mixes with the diluting medium, and a spring acting between the plunger and the second valve means, the spring being tensioned in a charging stroke and compressed in a delivery stroke and thereby causing the plunger to change from a charging stroke to a delivery stroke and vice versa, the plunger undergoing alternate charging and delivery strokes driven by the pressure of the diluting medium.

2. A dilution valve according to claim 1, wherein the plunger is a piston which makes slidable sealing contact with the wall of the mixing chamber.

3. A dilution valve according to claim 1, wherein the plunger moves within the mixing chamber with all round clearance bridged by a rolling diaphragm the outer periphery of which is attached to the wall of the mixing chamber and the inner periphery of which is attached to the plunger.

4. A dilution valve according to claim 1, wherein the second valve means include a shuttle valve with a central valve spool which shifts between two alternative positions respectively occupied during the charging and delivery strokes.

5. A dilution valve according to claim 4, wherein the valve spool has a central bore one end of which communicates with the mixing chamber and the other end of which is closable by the second valve means.

6. A dilution valve according to claim 4, wherein the spring is a helical spring which controls shifting of the spool between its two alternative positions.

7. A dilution valve according to claim 1, wherein the plunger is backed by a further spring which determines the out feed pressure during a delivery stroke.

8. A dilution valve according to claim 1, wherein the concentrate chamber is defined by a cylindrical bore within which slides a piston-like stem of the plunger, so that during a charging stroke the pressure of the incoming diluting medium moves the plunger, the resulting movement of the stem applying pressure to the concentrate in the concentrate chamber so as to open the first valve means.

9. A piglet feeder incorporating a dilution valve according to claim 1, the feeder having a feed cup, displacement of which opens a demand valve to allow the mixture to flow from the dilution valve and into the feed cup.

* * * * *